US009751394B1

(12) United States Patent
Speichinger et al.

(10) Patent No.: US 9,751,394 B1
(45) Date of Patent: Sep. 5, 2017

(54) COOLING PACKAGE MOUNTING ASSEMBLY

(71) Applicant: Caterpillar Inc., Peoria, IL (US)

(72) Inventors: Jeffrey J. Speichinger, Peoria, IL (US); Alexander S. Leanos, Metamora, IL (US); Joseph M. Huelsmann, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 15/264,628

(22) Filed: Sep. 14, 2016

(51) Int. Cl.
*B60K 11/04* (2006.01)
*E02F 9/08* (2006.01)
*B62D 25/08* (2006.01)
*E02F 3/76* (2006.01)

(52) U.S. Cl.
CPC ............ *B60K 11/04* (2013.01); *E02F 9/0866* (2013.01); *B62D 25/08* (2013.01); *E02F 3/7604* (2013.01)

(58) Field of Classification Search
CPC ....... B60K 11/02; B60K 11/04; E02F 9/0866; E02F 3/7604
USPC ...................................................... 180/68.6
See application file for complete search history.

(56) References Cited

U.S. PATENT DOCUMENTS

| 4,367,793 | A | | 1/1983 | MacIntosh | |
|---|---|---|---|---|---|
| 4,403,648 | A | * | 9/1983 | Styok | B60K 11/04 165/149 |
| 5,360,059 | A | * | 11/1994 | Olson | F28F 9/001 165/149 |
| 6,298,906 | B1 | * | 10/2001 | Vize | B60K 11/04 165/122 |
| 6,789,606 | B2 | | 9/2004 | Ohki | |
| 8,312,951 | B2 | | 11/2012 | Bui et al. | |
| 8,631,859 | B1 | | 1/2014 | Hettrich | |
| 2004/0200598 | A1 | | 10/2004 | Hitt et al. | |

\* cited by examiner

*Primary Examiner* — John Walters

(57) ABSTRACT

A cooling package mounting assembly for a machine is provided. The cooling package mounting assembly includes a first elongated frame member and a second elongated frame member. The cooling package mounting assembly also includes a first top coupling bracket, a second top coupling bracket, a first bottom coupling bracket and a second bottom coupling bracket. The cooling package mounting assembly includes a mounting arrangement coupled to at least one of the first elongated frame member and the second elongated frame member. In a first configuration, the mounting arrangement is configured to removably support a first type of heat exchanger of the cooling package between the first elongated frame member and the second elongated frame member. In a second configuration, the mounting arrangement is configured to removably support a second type of heat exchanger of the cooling package between the first elongated frame member and the second elongated frame member.

16 Claims, 5 Drawing Sheets

COOLING PACKAGE MOUNTING ASSEMBLY

TECHNICAL FIELD

The present disclosure relates to cooling packages, and more particularly relates to a mounting assembly for a cooling package of a machine.

BACKGROUND

Cooling packages are generally used in various machines for cooling liquids, such as engine coolant and lubricating oil. A cooling package typically includes a radiator for cooling engine coolant and various other heat exchangers for cooling other fluids. Generally, the radiator is mounted on a frame attached to a chassis of a machine and the heat exchangers are mounted along with the radiator. The frames are typically designed to mount a specific type of radiator. For example, a bar and plate type radiator is mounted on the chassis using a frame having securing means for coupling a lower portion and an upper portion of the radiator to the chassis, whereas a grommet tube radiator is mounted on the chassis of the machine by using a frame having securing means for coupling side portions of the radiator to the chassis. Since each frame is designed to mount a specific type of radiators, it is quite cumbersome to replace one type of radiator with another type of radiator with the existing frame. Therefore, a new frame may be used in order to replace one type of radiator with another in the machine.

U.S Publication Number 2004/0200598 relates to a frame for mounting at least one heat exchanger in a vehicle. The frame includes a longitudinal side and a transverse side, fasteners on the sides adapted to fasten to the at least one heat exchanger between the sides, and supports on the sides adapted to secure to a vehicle to support the frame therein. At least one of the sides is adjustable in length in the direction of the side. The frame includes a combination of L-shaped and/or U-shaped frame members having arms which are selectively interconnected to define the adjustable sides.

SUMMARY OF THE DISCLOSURE

In one aspect of the present disclosure, a cooling package mounting assembly for a machine having a radiator guard is provided. The cooling package mounting assembly includes a first elongated frame member having a C-shaped cross section. The first elongated frame member includes a top end portion and a bottom end portion opposite to the top end portion of the first elongated frame member. The cooling package mounting assembly also includes a first top leg extending outwardly from the top end portion of the first elongated frame member. The cooling package mounting assembly also includes a first bottom leg extending outwardly from the bottom end portion of the first elongated frame member, along the first top leg. The cooling package mounting assembly also includes a first set of gussets connecting the first bottom leg with the bottom end portion of the first elongated frame member. The cooling package mounting assembly also includes a second elongated frame member spaced apart from the first elongated frame member. The second elongated frame has a C-shaped cross section. The second elongated frame member includes a top end portion and a bottom end portion opposite to the top end portion of the second elongated frame member. The cooling package mounting assembly also includes a second top leg extending outwardly from the top end portion of the second elongated frame member. The cooling package mounting assembly also includes a second bottom leg extending outwardly from the bottom end portion of the second elongated frame member, along the second top leg. The cooling package mounting assembly also includes a second set of gussets connecting the second bottom leg with the bottom end portion of the second elongated frame member. The cooling package mounting assembly also includes a first top coupling bracket. The first top coupling bracket includes a first plate configured to be coupled to the radiator guard, and a second plate extending from the first plate. The second plate is configured to be coupled to the first top leg for coupling the first elongated frame member with the radiator guard. The cooling package mounting assembly also includes a second top coupling bracket. The second top coupling bracket includes a third plate configured to be coupled to the radiator guard, and a fourth plate extending from the third plate. The fourth plate is configured to be coupled to the second top leg for coupling the second elongated frame member with the radiator guard. The cooling package mounting assembly further includes a first bottom coupling bracket configured to couple the bottom end portion of the first elongated frame member with the radiator guard, The cooling package mounting assembly also includes a second bottom coupling bracket configured to couple the bottom end portion of the second elongated frame member with the radiator guard. The cooling package mounting assembly further includes a mounting arrangement coupled to at least one of the first elongated frame member and the second elongated frame member. In a first configuration of the mounting arrangement, the mounting arrangement is configured to removably support a first type of heat exchanger of the cooling package between the first elongated frame member and the second elongated frame member. In a second configuration of the mounting arrangement, the mounting arrangement is configured to removably support a second type of heat exchanger of the cooling package between the first elongated frame member and the second elongated frame member.

In another aspect of the present disclosure, a machine is provided. The machine includes a radiator guard and a cooling package. The machine also includes a cooling package mounting assembly coupled to the radiator guard and configured to mount the cooling package on the radiator guard. The cooling package mounting assembly includes a first elongated frame member having a C-shaped cross section. The first elongated frame member includes a top end portion and a bottom end portion opposite to the top end portion of the first elongated frame member. The cooling package mounting assembly also includes a first top leg extending outwardly from the top end portion of the first elongated frame member. The cooling package mounting assembly also includes a first bottom leg extending outwardly from the bottom end portion of the first elongated frame member, along the first top leg. The cooling package mounting assembly also includes a first set of gussets connecting the first bottom leg with the bottom end portion of the first elongated frame member. The cooling package mounting assembly also includes a second elongated frame member spaced apart from the first elongated frame member. The second elongated frame has a C-shaped cross section. The second elongated frame member includes a top end portion and a bottom end portion opposite to the top end portion of the second elongated frame member. The cooling package mounting assembly also includes a second top leg extending outwardly from the top end portion of the second elongated frame member. The cooling package mounting assembly also includes a second bottom leg extending outwardly from the bottom end portion of the second elongated frame member, along the second top leg. The cooling package mounting assembly also includes a second set of gussets connecting the second bottom leg with the bottom end portion of the second elongated frame member. The cooling package mounting assembly also includes a first top coupling bracket. The first top coupling bracket includes a first plate configured to be coupled to the radiator guard, and a second plate extending from the first plate. The second plate is configured to be coupled to the first top leg for coupling the first elongated frame member with the radiator guard. The cooling package mounting assembly also includes a second top coupling bracket. The second top coupling bracket includes a third plate configured to be coupled to the radiator guard, and a fourth plate extending from the third plate. The fourth plate is configured to be coupled to the second top leg for coupling the second elongated frame member with the radiator guard. The cooling package mounting assembly further includes a first bottom coupling bracket configured to couple the bottom end portion of the first elongated frame member with the radiator guard, The cooling package mounting assembly also includes a second bottom coupling bracket configured to couple the bottom end portion of the second elongated frame member with the radiator guard. The cooling package mounting assembly further includes a mounting arrangement coupled to at least one of the first elongated frame member and the second elongated frame member. In a first configuration of the mounting arrangement, the mounting arrangement is configured to removably support a first type of heat exchanger of the cooling package between the first elongated frame member and the second elongated frame member. In a second configuration of the mounting arrangement, the mounting arrangement is configured to removably support a second type of heat exchanger of the cooling package between the first elongated frame member and the second elongated frame member.

In yet another aspect of the present disclosure, a cooling package mounting assembly for a machine having a radiator guard is provided. The cooling package mounting assembly includes a first elongated frame member having a C-shaped cross section. The first elongated frame member includes a top end portion and a bottom end portion opposite to the top end portion of the first elongated frame member. The cooling package mounting assembly includes a first top leg extending outwardly from the top end portion of the first elongated frame member, and a first bottom leg extending outwardly from the bottom end portion of the first elongated frame member, along the first top leg. The cooling package mounting assembly also includes a first set of gussets connecting the first bottom leg with the bottom end portion of the first elongated frame member. The cooling package mounting assembly further includes a second elongated frame member spaced apart from the first elongated frame member. The second elongated frame member has a C-shaped cross section. The second elongated frame member includes a top end portion and a bottom end portion opposite to the top end portion of the second elongated frame member. The cooling package mounting assembly also includes a second top leg extending outwardly from the top end portion of the second elongated frame member, and a second bottom leg extending outwardly from the bottom end portion of the second elongated frame member, along the second top leg. The cooling package mounting assembly further includes a second set of gussets connecting the second bottom leg with the bottom end portion of the second elongated frame member. The cooling package mounting assembly includes a first top coupling bracket. The first top coupling bracket includes a first plate configured to be coupled to the radiator guard, and a second plate extending from the first plate. The second plate is configured to be coupled to the first top leg for coupling the first elongated frame member with the radiator guard. The cooling package mounting assembly also includes a second top coupling bracket. The second top coupling bracket includes a third plate configured to be coupled to the radiator guard, and a fourth plate extending from the third plate. The fourth plate is configured to be coupled to the second top leg for coupling the second elongated frame member with the radiator guard. The cooling package mounting assembly further includes a first bottom coupling bracket configured to couple the bottom end portion of the first elongated frame member with the radiator guard. The cooling package mounting assembly further includes a second bottom coupling bracket configured to couple the bottom end portion of the second elongated frame member with the radiator guard. The cooling package mounting assembly further includes a mounting arrangement coupled to at least one of the first elongated frame member and the second elongated frame member. In a first configuration of the mounting arrangement, the mounting arrangement is configured to removably support a first type of heat exchanger of the cooling package between the first elongated frame member and the second elongated frame member. In a second configuration of the mounting arrangement, the mounting arrangement is configured to removably support a second type of heat exchanger of the cooling package between the first elongated frame member and the second elongated frame member. In the first configuration, the mounting arrangement includes a top tank configured to be coupled to each of the first top leg and the second top leg, and a bottom tank configured to be coupled to each of the first bottom coupling bracket and the second bottom coupling bracket. A plurality of tubes of a cooling core extends between the top tank and the bottom tank such that the cooling core is supported between the first elongated frame member and the second elongated frame member. In the second configuration, the mounting arrangement includes a top mounting plate coupled to the first top leg and the second top leg, and a bottom mounting plate coupled to first bottom coupling bracket and the second bottom coupling bracket. The top mounting plate, the bottom mounting plate, the first elongated frame member, and the second elongated frame member together define a cuboidal chamber for removably receiving the heat exchanger therein.

Other features and aspects of this disclosure will be apparent from the following description and the accompanying drawings.

DETAILED DESCRIPTION

Reference will now be made in detail to specific embodiments or features examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

Figure 1:
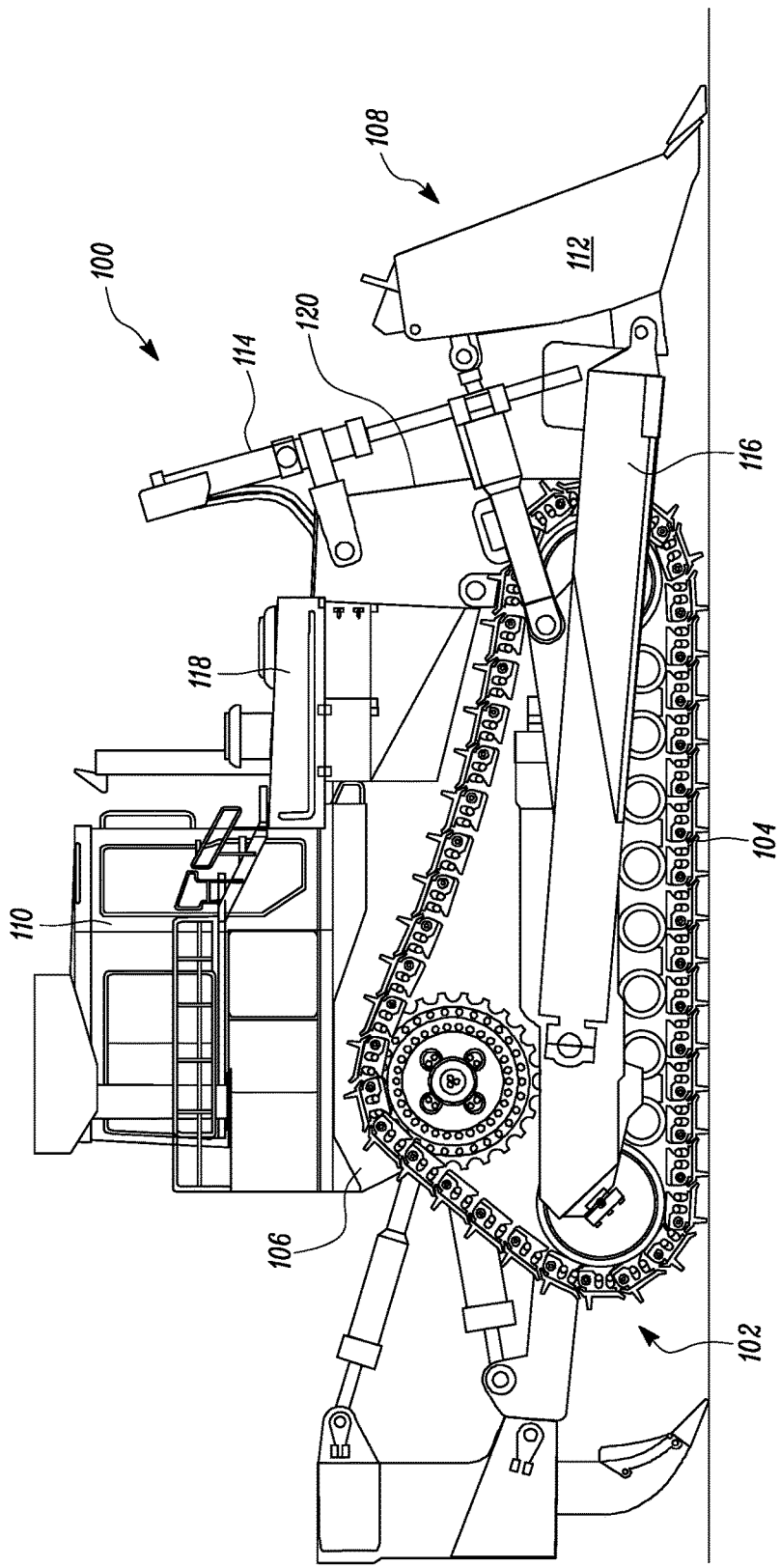
FIG. 1 is a side view of a machine, according to an embodiment of the present disclosure.

FIG. 1 illustrates a perspective view of an exemplary machine 100. The machine 100, as illustrated, may embody an earth moving machine, such as a dozer. Alternatively, the machine 100 may be any other earth moving machine, such as a track type loader, a wheel loader, a compactor, an excavator, and a motor grader, or a stationary machine, such as a generator set.

As shown in FIG. 1, the machine 100 includes an undercarriage 102 for moving the machine 100 over a ground surface. The undercarriage 102 includes ground engaging members 104 that engage with the ground surface to move the machine 100 along the ground surface. In the illustrated aspect of the present disclosure, the ground engaging members 104 are a pair of track assemblies. However, in another aspect of the present disclosure, the ground engaging members 104 may be multiple wheels.

The machine 100 further includes a chassis 106 disposed on the undercarriage 102. The chassis 106 supports various components of the machine 100 including an implement system 108, an operator cab 110 and an engine (not shown). The implement system 108 may include an implement 112, one or more actuators 114 for moving the implement 112 with respect to the chassis 106, and a plurality of lift arms 116 for connecting the implement 112 to the chassis 106. The implement 112 is configured to collect, hold and convey material and/or heavy objects on the ground surface. The actuators 114 may be configured to effectuate the movement of the implement 112 based on an operator command received through various input devices disposed within the operator cab 110. Further, the engine may provide power to the ground engaging members 104, the implement system 108 and various other components of the machine 100.

The engine may be, for example, a diesel engine, a gasoline engine, a gaseous fuel engine, or any other type of combustion engine. The engine may be enclosed by an engine hood 118 within an engine compartment (not shown) of the machine 100. The engine hood 118 is coupled to a grille 120 that allows air to enter the engine compartment. The machine 100 further includes a cooling package 122 (shown in FIG. 2) enclosed by the engine hood 118. The cooling package 122 may be disposed adjacent to the grille 120 within the engine compartment. The cooling package 122 may be configured to cool the engine and various other components, for example transmission of the machine 100.

Figure 2:
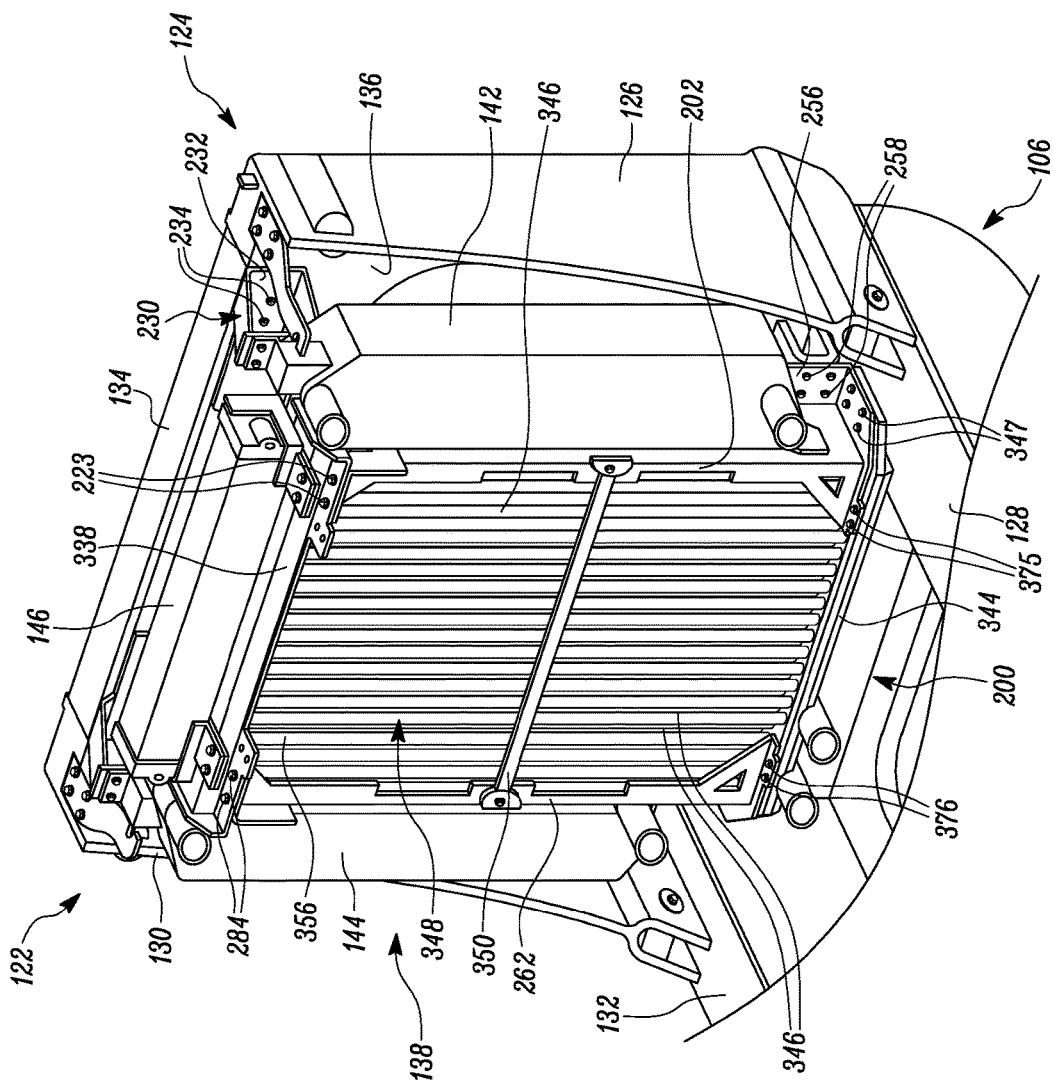
FIG. 2 is a perspective view of a cooling package mounting assembly coupled to a radiator guard of the machine, according to an embodiment of the present disclosure.

Referring to FIG. 2, a perspective view of the cooling package 122 is shown. For clarity purposes, one or more components of the machine 100, for example the engine hood 118, and the engine, are not shown in FIG. 2. The cooling package 122 is supported on a radiator guard 124 of the machine 100. The radiator guard 124 is disposed between a first rail member 128 and a second rail member 132 of the chassis 106. The radiator guard 124 includes a first plate member 126 coupled to the first rail member 128 of the chassis 106, and a second plate member 130 coupled to the second rail member 132 of the chassis 106. Owing to coupling of the first and the second plate members 126, 130 with the first and second rail members 128, 130, the first plate member 126 and the second plate member 130, as shown, may be secured in lateral spaced, parallel relationship to one another. The radiator guard 124 further includes a horizontal bar 134 extending between the first plate member 126 and the second plate member 130. The radiator guard 124 also includes a support plate 136 coupled to the horizontal bar 134 and extending between the first plate member 126 and the second plate member 130. The support plate 136 may be coupled with the grille 120 of the machine 100. The support plate 136 defines an aperture 140 (shown in FIG. 3) for allowing air to flow therethrough. In an embodiment, the aperture 140 is circular in shape. However, in various other embodiments, the aperture 140 may be rectangular, oval or any other shape.

Figure 4:
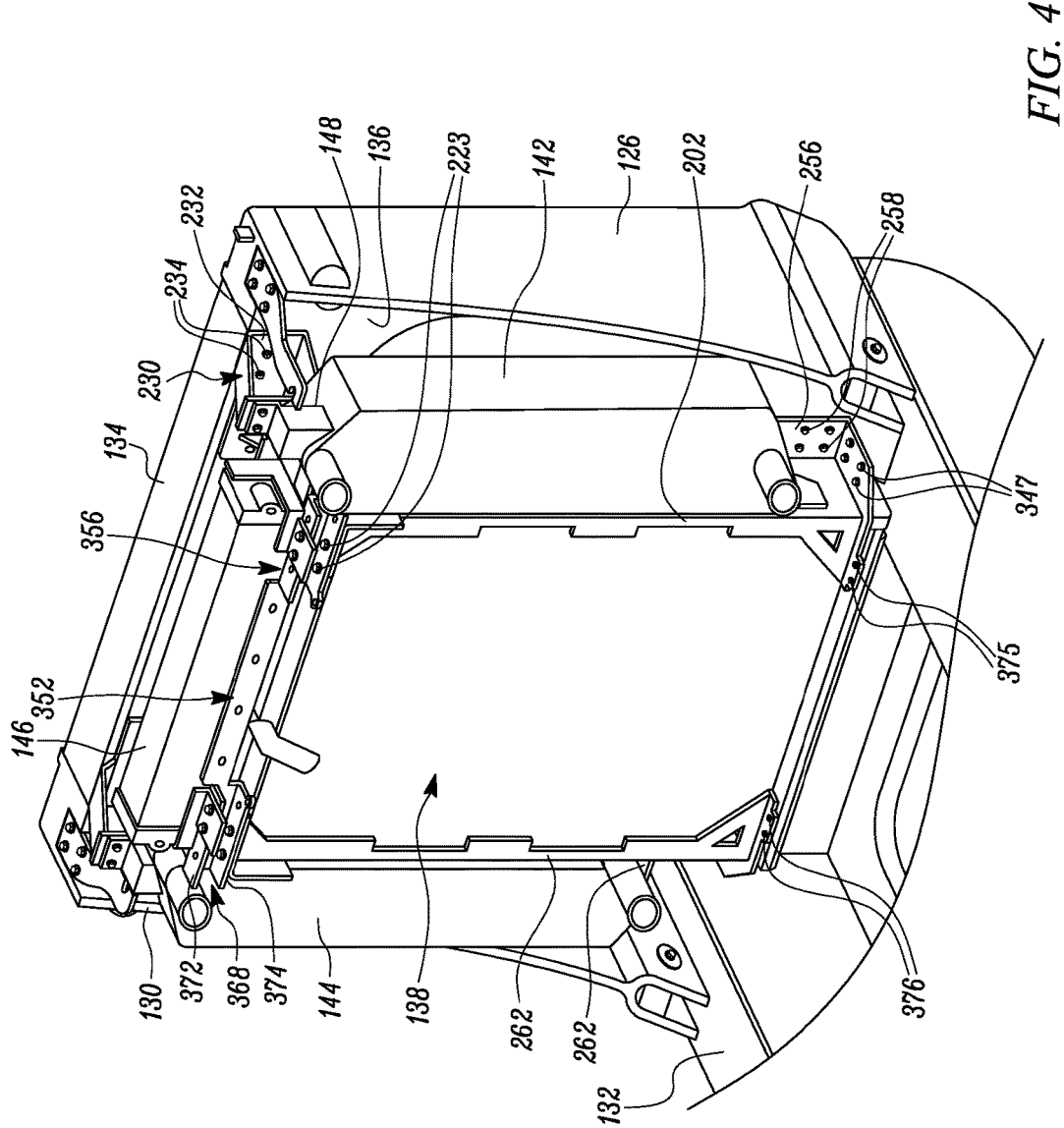
FIG. 4 is a perspective view of the cooling package mounting assembly having the mounting arrangement in a second configuration thereof, according to an embodiment of the present disclosure.

As shown in FIG. 2, the cooling package 122 includes a heat exchanger 138 configured to cool coolant of the engine. Numerous types of heat exchangers may be used in the cooling package 122 depending upon an application of the machine 100 and a type of the engine. For example, the heat exchanger 138, as shown in FIG. 2, may be a multi-component heat exchanger, such as a grommet tube heat exchanger. Alternatively, the heat exchanger 138, as shown in FIG. 4, may be a single component heat exchanger, such as a bar and plate heat exchanger. In an embodiment, the cooling package 122 may additionally include multiple auxiliary coolers, such as a first charge air cooler 142, a second charge air cooler 144, and an oil cooler 146, for cooling various other components of the engine. In an example, the first charge air cooler 142 and the second charge air cooler 144 are air to air coolers configured to cool charge air entering the engine of the machine 100. Further, the oil cooler 146 is hydraulic oil coolers configured to cool liquids, such as lubrication oil and transmission oil of the machine 100.

The machine 100 further includes a cooling package mounting assembly 200 configured to mount the cooling package 122 on the radiator guard 124. Specifically, the cooling package mounting assembly 200 is coupled to the radiator guard 124 and is configured to mount the cooling package 122 on the support plate 136 of the radiator guard 124. The cooling package mounting assembly 200 is also configured to mount different types of heat exchangers along with the first and second charge air coolers 142, 144 and the oil cooler 146 on the radiator guard 124.

Figure 3:
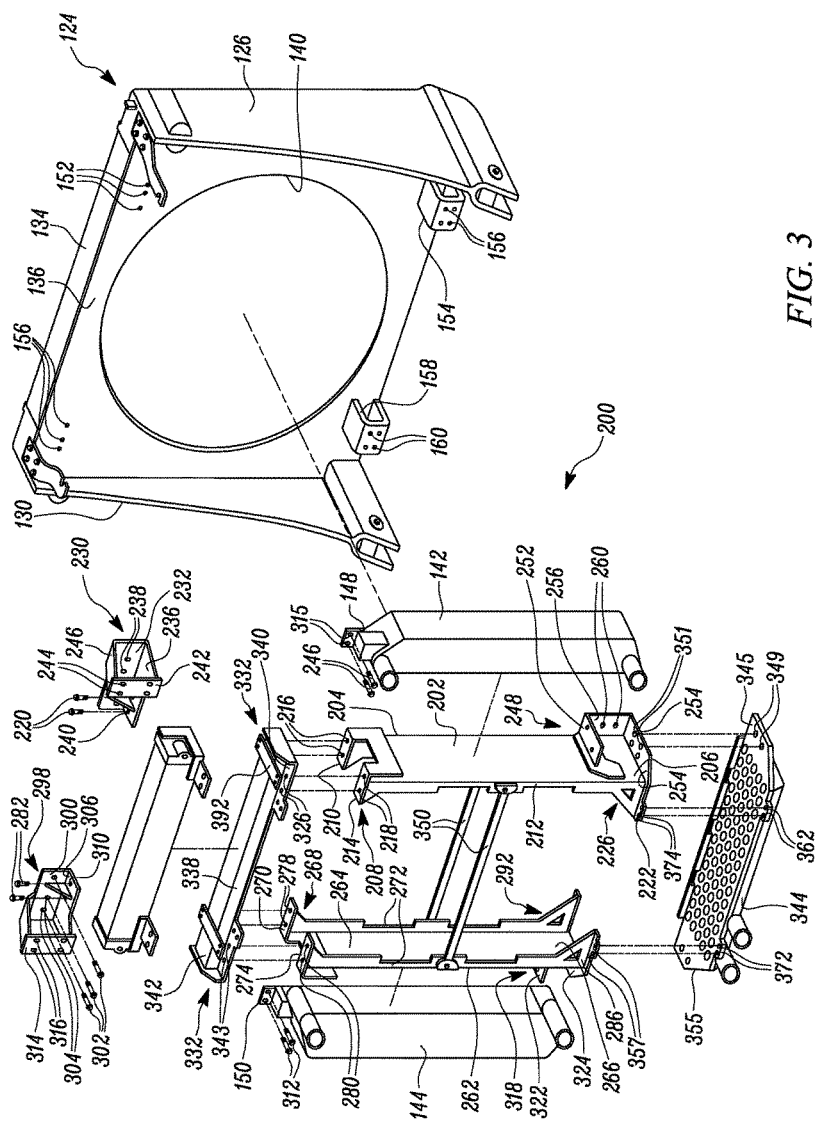
FIG. 3 is an exploded view of the cooling package mounting assembly having a mounting arrangement in a first configuration thereof, according to an embodiment of the present disclosure.

FIG. 3 illustrates an exploded view of the cooling package mounting assembly 200. Referring to FIGS. 2 and 3, the cooling package mounting assembly 200 includes a first elongated frame member 202 having a C-shaped cross section. The first elongated frame member 202 includes a first pair of projecting plates 212 (one of which is shown in FIG. 3) extending at opposing sides of the first elongated frame member 202 such that the first elongated frame member 202 has a C-shaped cross section. The first elongated frame member 202 also includes a top end portion 204, a bottom end portion 206 opposite to the top end portion 204. A length of the first elongated frame member 202 may be defined between the top end portion 204 and the bottom end portion 206 of the first elongated frame member 202.

The cooling package mounting assembly 200 also includes a first top leg 208 extending outwardly from the top end portion 204 of the first elongated frame member 202. In an embodiment, the first top leg 208 is an external member welded to the top end portion 204 of the first elongated frame member 202. However, in various other embodiments, the first top leg 208 may be an integral portion of the first elongated frame member 202. Although in the present embodiment, the first top leg 208 is shown to be welded to the top end portion 204 of the first elongated frame member 202, it is understood that a plurality of bolts, screws or any other fastening members known in the art may be used for coupling the first top leg 208 with the bottom end portion 206 of the first elongated frame member 202. The first top leg 208 further includes a first projecting plate 210 and a second projecting plate 214. The first projecting plate 210 includes a plurality of holes 216 that are configured to receive a plurality of fasteners 220. Further, the second projecting plate 214 includes a plurality of holes 218 that are configured to receive fasteners 223 (shown in FIG. 2).

The cooling package mounting assembly 200 also includes a first bottom leg 222 extending outwardly from the bottom end portion 206 of the first elongated frame member 202 along the first top leg 208, i.e. in a direction of extension of the first top leg 208. In an embodiment, the first bottom leg 222 is an external member welded to the bottom end portion 206 of the first elongated frame member 202. However, in various other embodiments, the first bottom leg 222 may be an integral portion of the first elongated frame member 202. Although in the illustrated embodiment, the first bottom leg 222 is shown to be welded to the bottom end portion 206 of the first elongated frame member 202, it is understood that a plurality of bolts, screws or any other fastening members known in the art may be used for coupling the first bottom leg 222 with the bottom end portion 206 of the first elongated frame member 202. The cooling package mounting assembly 200 further includes a first set of gussets 226 connecting the first bottom leg 222 with the bottom end portion 206 of the first elongated frame member 202. In an embodiment, the first set of gussets 226 includes two gussets (one of which is shown in FIG. 3) disposed opposite to each other.

As shown in FIGS. 2 and 3, the cooling package mounting assembly 200 includes a first top coupling bracket 230. The first top coupling bracket 230 includes a first plate 232 configured to be coupled to the radiator guard 124. In an embodiment, the first plate 232 is configured to be coupled to the support plate 136 of the radiator guard 124, via a plurality of fasteners 234 (shown in FIG. 2). In particular, the fasteners 234 are received through a plurality of holes 238 (shown in FIG. 3) of the first plate 232 and a plurality of holes 152 of the support plate 136 to couple the first top coupling bracket 230 with the radiator guard 124. In an embodiment, the holes 238 of the first plate 232 are oblong holes such that a position and an orientation of the first top coupling bracket 230 with respect to the support plate 136 may be adjusted.

The first top coupling bracket 230 also includes a second plate 236 (shown in FIG. 3) extending from the first plate 232. The second plate 236 is configured to be coupled to the first top leg 208 for coupling the first elongated frame member 202 with the support plate 136 of the radiator guard 124. In an embodiment, a plurality of holes 240 of the second plate 236 are aligned with the plurality of holes 216 of the first projecting plate 210 of the first top leg 208 to receive the fasteners 220. The first top coupling bracket 230 may further include a first connecting plate 242 extending from the second plate 236. Specifically, the first connecting plate 242 extends from the second plate 236 such that the first connecting plate 242, the first plate 232 and the second plate 236 are connected to each other. The first connecting plate 242 includes a plurality of holes 244 that are configured to receive a plurality of fasteners 246 therethrough.

The cooling package mounting assembly 200 further includes a first bottom coupling bracket 248 configured to couple the bottom end portion 206 of the first elongated frame member 202 with the radiator guard 124. The first bottom coupling bracket 248 is coupled to the first elongated frame member 202. In an embodiment, the first bottom coupling bracket 248 is an external member welded to the bottom end portion 206 of the first elongated frame member 202. However, in various other embodiments, the first bottom coupling bracket 248 may be an integral portion of the first elongated frame member 202. Although in the illustrated embodiment, the first bottom coupling bracket 248 is shown to be welded to the bottom end portion 206 of the first elongated frame member 202, it is understood that a plurality of bolts, screws or any other fastening members known in the art may be used for coupling the first bottom coupling bracket 248 with the bottom end portion 206 of the first elongated frame member 202. Additionally, a connecting plate (not shown), as shown in FIG. 3, may also be coupled to the first bottom coupling bracket 248 for coupling the first bottom coupling bracket 248 with the bottom end portion 206 of the first elongated frame member 202.

The first bottom coupling bracket 248 includes a top plate 252, a bottom plate 254 opposite to the top plate 252, and a side plate 256 extending between the top plate 252 and the bottom plate 254. In an example, the bottom plate 254 may be an extension of the first bottom leg 222. Further, the side plate 256 may be extension of the bottom plate 254 such that the top plate 252, the bottom plate 254 and the side plate 256 forms a unitary structure. In an embodiment, the side plate 256 may be configured to be coupled to a first mounting block 154 of the radiator guard 124 to couple the first bottom coupling bracket 248 with the radiator guard 124. In an example, the side plate 256 is coupled to the first mounting block 154 of the radiator guard 124, via a plurality of fasteners 258 (shown in FIG. 2). The plurality of fasteners 258 are received through a plurality of holes 260 of the side plate 256 and a plurality of holes 156 of the first mounting block 154 for coupling the first bottom coupling bracket 248 with the radiator guard 124.

As shown in FIGS. 2 and 3, the cooling package mounting assembly 200 includes a second elongated frame member 262 spaced apart from the first elongated frame member 202. The second elongated frame member 262 includes a second pair of projecting plates 272 extending at opposing sides of the second elongated frame member 262 such that the second elongated frame member 262 has a C-shaped cross section. The second elongated frame member 262 also includes a top end portion 264, a bottom end portion 266 opposite to the top end portion 264. A length of the second elongated frame member 262 may be defined between the top end portion 264 and the bottom end portion 266 of the second elongated frame member 262.

The cooling package mounting assembly 200 also includes a second top leg 268 extending outwardly from the top end portion 264 of the second elongated frame member 262. In an embodiment, the second top leg 268 is an external member welded to the top end portion 264 of the second elongated frame member 262. However, in various other embodiments, the second top leg 268 may be an integral portion of the second elongated frame member 262. Although in the present embodiment, the second top leg 268 is shown to be welded to the top end portion 264 of the second elongated frame member 262, it is understood that a plurality of bolts, screws or any other fastening members known in the art may be used for coupling the second top leg 268 with the top end portion 264 of the second elongated frame member 262. The second top leg 268 further includes a third projecting plate 270 and a fourth projecting plate 274. The third projecting plate 270 includes a plurality of holes 278 that are configured to receive a plurality of fasteners 282. Further, the fourth projecting plate 274 includes a plurality of holes 280 that are configured to receive a plurality of fasteners 284 (shown in FIG. 2).

The cooling package mounting assembly 200 also includes a second bottom leg 286 extending outwardly from the bottom end portion 266 of the second elongated frame member 262 along the second top leg 268, i.e. in a direction of extension of the second top leg 268. In an embodiment, the second bottom leg 286 is an external member welded to the bottom end portion 266 of the second elongated frame member 262. However, in various other embodiments, the second bottom leg 286 may be an integral portion of the second elongated frame member 262. Although in the illustrated embodiment, the second bottom leg 286 is shown to be welded to the bottom end portion 266 of the second elongated frame member 262, it is understood that a plurality of bolts, screws or any other fastening members known in the art may be used for coupling the second bottom leg 286 with the bottom end portion 266 of the second elongated frame member 262. The cooling package mounting assembly 200 further includes a second set of gussets 292 connecting the second bottom leg 286 with the bottom end portion 266 of the second elongated frame member 262. In an embodiment, the second set of gussets 292 includes two gussets disposed opposite to each other.

As shown in FIGS. 2 and 3, the cooling package mounting assembly 200 includes a second top coupling bracket 298. The second top coupling bracket 298 includes a third plate 300 (shown in FIG. 3) configured to be coupled to the radiator guard 124. In an embodiment, the third plate 300 is configured to be coupled to the support plate 136 of the radiator guard 124, via a plurality of fasteners 302. In particular, the fasteners 302 are received through a plurality of holes 304 of the third plate 300 and a plurality of holes 156 of the support plate 136 to couple the second top coupling bracket 298 with the radiator guard 124. In an embodiment, the holes 304 of the third plate 300 are oblong holes such that a position and an orientation of the second top coupling bracket 298 with respect to the support plate 136 may be adjusted.

The second top coupling bracket 298 also includes a fourth plate 306 extending from the third plate 300. The fourth plate 306 is configured to be coupled to the second top leg 268 for coupling the second elongated frame member 262 with the support plate 136 of the radiator guard 124. In an embodiment, a plurality of holes 310 of the fourth plate 306 are aligned with the plurality of holes 278 of the third projecting plate 270 of the second top leg 268 to receive the fasteners 282. The second top coupling bracket 298 may further include a second connecting plate 314 extending from the fourth plate 306. Specifically, the second connecting plate 314 extends from the fourth plate 306 such that the second connecting plate 314, the third plate 300 and the fourth plate 306 are connected to each other. The second connecting plate 314 includes a plurality of holes 316 that are configured to receive a plurality of fasteners 312 therethrough.

The cooling package mounting assembly 200 further includes a second bottom coupling bracket 318 configured to couple the bottom end portion 266 of the second elongated frame member 262 with the radiator guard 124. The second bottom coupling bracket 318 is coupled to the second elongated frame member 262. In an embodiment, the second bottom coupling bracket 318 is an external member welded to the bottom end portion 266 of the second elongated frame member 262. However, in various other embodiments, the second bottom coupling bracket 318 may be an integral portion of the second elongated frame member 262. Although in the illustrated embodiment, the second bottom coupling bracket 318 is shown to be welded to the bottom end portion 266 of the second elongated frame member 262, it is understood that a plurality of bolts, screws or any other fastening members known in the art may be used for coupling the second bottom coupling bracket 318 with the bottom end portion 266 of the second elongated frame member 262. Additionally, a connecting plate (not shown), as shown in FIG. 3, may also be coupled to the second bottom coupling bracket 318 for coupling the second bottom coupling bracket 318 with the bottom end portion 266 of the second elongated frame member 262.

The second bottom coupling bracket 318 includes a top plate 322, a bottom plate 324 opposite to the top plate 322, and a side plate (not shown) extending between the top plate 322 and the bottom plate 324. In an example, the bottom plate 324 may be an extension of the second bottom leg 286. Further, the side plate may be extension of the bottom plate 324 such that the top plate 322, the bottom plate 324 and the side plate forms a unitary structure. In an embodiment, the side plate may be configured to be coupled to a second mounting block 158 of the radiator guard 124 to couple the second bottom coupling bracket 318 with the radiator guard 124. In an example, the side plate is coupled to the second mounting block 158 of the radiator guard 124, via a plurality of fasteners (not shown). The plurality of fasteners are received through a plurality of holes (not shown) of the side plate and a plurality of holes 160 of the second mounting block 158 for coupling the second bottom coupling bracket 318 with the radiator guard 124.

The cooling package mounting assembly 200 further includes a mounting arrangement 332 coupled to at least one of the first elongated frame member 202 and the second elongated frame member 262. More specifically, the mounting arrangement 332 may be coupled to at least one of the first elongated frame member 202 and the second elongated frame member 262 in a first configuration and in a second configuration thereof. In the first configuration, the mounting arrangement 332 is configured to removably support a first type of heat exchanger 138 (shown in FIG. 2) of the cooling package 122 between the first elongated frame member 202 and the second elongated frame member 262. In the second configuration, the mounting arrangement 332 is configured to removably support a second type of heat exchanger 138 (shown in FIG. 4) of the cooling package 122 between the first elongated frame member 202 and the second elongated frame member 262. In an embodiment, the first type of heat exchanger 138 is a grommet tube heat exchanger, and the second type of heat exchanger 138 is a bar and plate heat exchanger.

In the first configuration, the mounting arrangement 332 includes a top tank 338 (shown in FIG. 3) configured to be coupled to each of the first top leg 208 and the second top leg 268. A first end 340 is coupled to the first top leg 208 of the first elongated frame member 202, via the fasteners 223. Specifically, the fasteners 223 are received through a plurality of holes 326 of the first end 340 and the holes 218 of the second projecting plate 214 for coupling the top tank 338 with the first top leg 208. Further, a second end 342 of the top tank 338 is coupled to the second top leg 268, via the fasteners 284 (shown in FIG. 2). Specifically, the fasteners 284 are received through a plurality of holes 343 of the second end 342 and the holes 280 of the fourth projecting plate 274 for coupling the top tank 338 with the second top leg 268.

The mounting arrangement 332 further includes a bottom tank 344 configured to be coupled to each of the first bottom coupling bracket 248 and the second bottom coupling bracket 318. A first end 345 of the bottom tank 344 is coupled to the bottom plate 254 of the first bottom coupling bracket 248, via a plurality of fasteners 347 (shown in FIG. 2). Specifically, the fasteners 347 are received through a plurality of holes 349 of the first end 345 of the bottom tank 344 and a plurality of holes 351 of the bottom plate 254 of the first bottom coupling bracket 248. Further, a second end 355 of the bottom tank 344 is coupled to the bottom plate 324 of the second bottom coupling bracket 318, via a plurality of fasteners (not shown). The fasteners are received through a plurality of holes 360 of the second end 355 of the bottom tank 344 and a plurality of holes (not shown) of the bottom plate 324 of the second bottom coupling bracket 318 to couple the bottom tank 344 with the second bottom coupling bracket 318. In an embodiment, the bottom tank 344 is also coupled to the first bottom leg 222 and the second bottom leg 286. Specifically, the bottom tank 344 includes a first pair of holes 362 aligned with a pair of holes 374 of the first bottom leg 222 to receive a pair of fasteners 375. The bottom tank 344 also includes a second pair of holes 372 aligned with a pair of holes 357 of the second bottom leg 286 to receive a pair of fasteners 376.

In the first type of the heat exchanger 138, a plurality of tubes 346 (shown in FIG. 2) form a cooling core 348 (shown in FIG. 2). The plurality of tubes 346 extends between the top tank 338 and the bottom tank 344 such that the cooling core 348 is supported between the first elongated frame member 202 and the second elongated frame member 262. Further, a plurality of connecting members 350 also extends between the first elongated frame member 202 and the second elongated frame member 262 to support the plurality of tubes 346 of the cooling core 348 between the first elongated frame member 202 and the second elongated frame member 262. Specifically, a movement of the plurality of tubes 346 between the first elongated frame member 202 and the second elongated frame member 262 is restricted.

In an embodiment, the machine 100 may include an electric drive system (not shown) having a generator unit (not shown). The generator unit may include an electrical generator (not shown). The electric drive system further includes one or more electrical motors (not shown) that may be powered by the electrical generator to drive the ground engaging members 104 and the implement system 108. In such an embodiment, the mounting arrangement 332 may also be used to mount the first type of heat exchanger 138, i.e. grommet tube radiator, having a low temperature radiator circuit and a high temperature radiator circuit. Specifically, the plurality of tubes 346 of the first type of heat exchanger 138 may be divided into the low temperature radiator circuit (not shown) to cool the one type of electrical components and a high temperature radiator circuit for cooling another type of electrical components.

A first type of coolant may flow through the low temperature radiator circuit and a second type of coolant may flow through the pair of high temperature radiator circuit. Further, the mounting arrangement 332 may include a pair of low temperature tanks for receiving the first type of coolant. The pair of low temperature tanks may be coupled to the first top coupling bracket 230 and the first bottom coupling bracket 248. The mounting arrangement 322 may further include a pair of high temperature tanks for receiving the second type of coolant. The pair of high temperature tanks may be coupled to the second top coupling bracket 298 and the second bottom coupling bracket 318. In an example, a single tank, such as the top tank 338, may be divided into a first low temperature tank of the pair of low temperature tanks and a first high temperature tank of the pair of high temperature tanks by using a first baffle (not shown). Similarly, a single tank, such as the bottom tank 344, may be divided into a second low temperature tank of the pair of low temperature tanks and a second high temperature tank of the pair of high temperature tanks by using a second baffle. However, it is contemplated that the top tank 338 may alternatively be divided into the pair of the pair of low temperature tanks and the bottom tank 344 may be divided into of the pair of high temperature tanks, without any limitation to the scope of the present disclosure.

Figure 5:
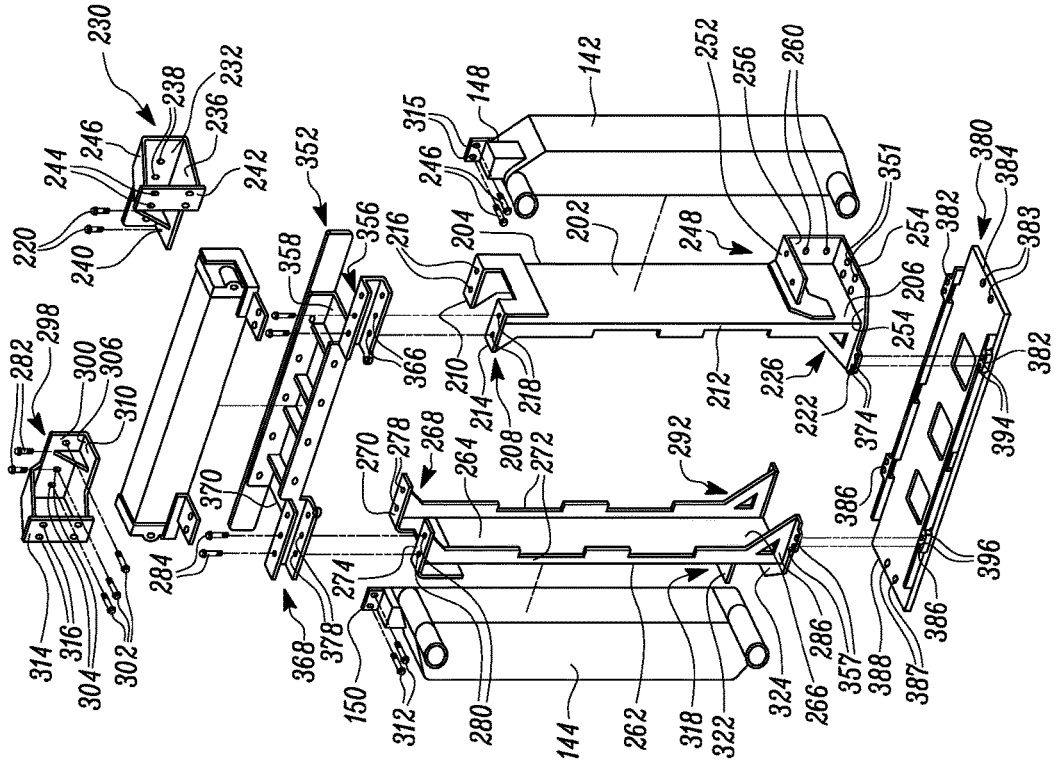
FIG. 5 is an exploded view of the cooling package mounting assembly having the mounting arrangement in the second configuration thereof, according to an embodiment of the present disclosure.

FIG. 4 illustrates a perspective view of the cooling package mounting assembly 200 having the mounting arrangement 332 in the second configuration. FIG. 5 illustrates an exploded view of the cooling package mounting assembly 200 having the mounting arrangement 332 in the second configuration. Referring to FIGS. 4 and 5, in the second configuration, the mounting arrangement 332 includes a top mounting plate 352 coupled to the first top leg 208 and the second top leg 268. The top mounting plate 352 includes a first C-shaped mounting portion 356 disposed at a first end 358 of the top mounting plate 352. The first C-shaped mounting portion 356 is coupled to the first projecting plate 210 of the first top leg 208, via the fasteners 223 (shown in FIG. 4). Specifically, the fasteners 223 are received through a plurality of holes 366 of the first C-shaped mounting portion 356 and the holes 218 of the second projecting plate 214 to couple the top mounting plate 352 and the first top leg 208. Further, the top mounting plate 352 includes a second C-shaped mounting portion 368 disposed at a second end 370 of the top mounting plate 352. The second C-shaped mounting portion 368 is coupled to the fourth projecting plate 274 of the second top leg 268, via the fasteners 284. Specifically, the fasteners 284 are received through a plurality of holes 378 of the bottom coupling section 374 of the second C-shaped mounting portion 368 and the holes 280 of the fourth projecting plate 274 to couple the top mounting plate 352 and the second top leg 268.

The mounting arrangement 332 further includes a bottom mounting plate 380 coupled to the first bottom coupling bracket 248 and the second bottom coupling bracket 298. A first end 384 of the bottom mounting plate 380 is coupled to the bottom plate 254 of the first bottom coupling bracket 248, via the plurality of fasteners 347 (shown in FIG. 4). Specifically, the fasteners 347 are received through a plurality of holes 383 of the first end 384 of the bottom mounting plate 380 and the plurality of holes 351 of the bottom plate 254 of the first bottom coupling bracket 248. Further, a second end 388 of the bottom tank 344 is coupled to the bottom plate 324 of the second bottom coupling bracket 318, via a plurality of fasteners (not shown). The fasteners are received through a plurality of holes 387 of the second end 388 of the bottom tank 344 and a plurality of holes (not shown) of the bottom plate 324 of the second bottom coupling bracket 318. In an embodiment, the bottom mounting plate 380 includes a first pair of side extending plates 382 disposed at the first end 384 of the bottom mounting plate 380. The bottom mounting plate 380 also includes a second pair of side extending plates 386 disposed at the second end 388 of the bottom mounting plate 380. The first pair of side extending plates 382 is coupled to the first bottom leg 222, via the fasteners 375 (shown in FIG. 4). Specifically, the fasteners 375 are received through a plurality of holes 394 of the first pair of side extending plates 382 and the plurality of holes 374 of the first bottom leg 222 to couple the bottom mounting plate 380 with the first elongated frame member 202. Further, the second pair of side extending plates 386 is coupled to the second bottom leg 286, via the fasteners 375. Specifically, the fasteners 375 are received through a plurality of holes 396 of the second pair of side extending plates 386 and the plurality of holes 357 of the second bottom leg 286 to couple the bottom mounting plate 380 with the second elongated frame member 262. In assembly, the top mounting plate 352, the bottom mounting plate 380, the first elongated frame member 202, and the second elongated frame member 262 together define a cuboidal chamber 390 for removably receiving the heat exchanger 138 therein.

Referring to FIGS. 2 to 5, the first charge air cooler 142, the second charge air cooler 144, and the oil cooler 146 of the cooling package 122 are mounted on the cooling package mounting assembly 200 along with the heat exchanger 138. The first charge air cooler 142 is disposed on the first elongated frame member 202 and the second charge air cooler 144 is disposed on the second elongated frame member 262. A first end 148 of the first charge air cooler 142 is coupled to the first connecting plate 242 of the first top coupling bracket 230 through the fasteners 246 and a second end (not shown) of the first charge air cooler 142 is coupled to the top plate 252 of the first bottom coupling bracket 248 through fasteners (not shown). Similarly, a first end 150 of the second charge air cooler 144 is coupled to the second connecting plate 314 of the second top coupling bracket 298 through the fasteners 312 and a second end (not shown) of the second charge air cooler 144 is coupled to the top plate 322 of the second bottom coupling bracket 318 through fasteners (not shown). Further, the oil cooler 146 may be disposed on the top tank 338 in the first configuration of the mounting arrangement 332 and on the top mounting plate 352 in the second configuration of the heat exchanger 138. Furthermore, the oil cooler 146 may be coupled to the first top coupling bracket 230 and the second top coupling bracket 298 in both the first configuration and the second configuration of the mounting arrangement 332. Additionally, one or more connectors, such as a connecting bracket 392, may also be used to mount the oil cooler 146 within the cooling package mounting assembly 200.

Various embodiments disclosed herein are to be taken in the illustrative and explanatory sense, and should in no way be construed as limiting of the present disclosure. Additionally, all numerical terms, such as, but not limited to, "first", "second", "third", or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It is to be understood that individual features shown or described for one embodiment may be combined with individual features shown or described for another embodiment. The above-described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

INDUSTRIAL APPLICABILITY

Embodiments of the present disclosure have applicability for use and implementation in mounting the cooling package 122 of the machine 100. More specifically, the cooling package mounting assembly 200 of the present disclosure may be used to mount any type of the heat exchanger along with auxiliary coolers of the cooling package 122.

As described earlier, the cooling package mounting assembly 200 includes the first elongated frame member 202 and the second elongated frame member 262. The first elongated frame member 202 may be coupled with the radiator guard 124 by the first top coupling bracket 230 and the first bottom coupling bracket 248. Similarly, the second elongated frame member 262 may be coupled with the radiator guard 124 by the second top coupling bracket 298 and the second bottom coupling bracket 318. Since, each of the first top coupling bracket 230 and the second top coupling bracket 298 includes oblong holes 238, 304 respectively, that provide flexibility in mounting the first elongated frame member 202, and the second elongated frame member 262. Specifically, positioning and orientation of the first elongated frame member 202 and the second elongated frame member 262 may be adjusted. Therefore, different sizes of heat exchangers may be mounted on the radiator guard 124 of the machine 100.

Further, the mounting arrangement 332 of the cooling package mounting assembly 200 is configured to mount the first type of heat exchanger 138, and the second type of heat exchanger 138. As shown in FIG. 2, in the first configuration, the mounting arrangement 332 is configured to mount the first type of heat exchanger 138, such as the grommet tube heat exchanger. In the first configuration, the mounting arrangement 332 includes the top tank 338 and the bottom tank 344 of the heat exchanger 138. The top tank 338 of the first type of heat exchanger 138 is coupled to each of the first top leg 208 and the second top leg 268. The bottom tank 344 of the first type of heat exchanger 138 is coupled to each of the first bottom coupling bracket 248 and the second bottom coupling bracket 318. Further, the plurality of tubes 346 of the cooling core 348 extend between the top tank 338 and the bottom tank 344 such that the cooling core 348 is supported between the first elongated frame member 202 and the second elongated frame member 262. The tubes 346 of the cooling core 348 are also supported by the connecting members 350. Thus, the cooling core 348 of the first type of heat exchanger 138 may be suitably mounted between and connected with the top tank 338 and the bottom tank 344. In the second configuration (as shown in FIG. 3), the mounting arrangement 332 is configured to mount the second type of heat exchanger 138, such as the bar and plate heat exchanger. In the second configuration, the mounting arrangement 332 includes the top mounting plate 352 and the bottom mounting plate 354. The top mounting plate 352 is coupled to the first top leg 208 and the second top leg 268, and the bottom mounting plate 354 is coupled to the first bottom coupling bracket 248 and the second bottom coupling bracket 318. The top mounting plate 352, the bottom mounting plate 354, the first elongated frame member 202, and the second elongated frame member 262 together define the cuboidal chamber 390 for removably receiving the second type of heat exchanger 138 therein. Therefore, the cooling package mounting assembly 200 may be used to mount different types of heat exchanger including a multi-component heat exchanger, for example the grommet tube heat exchanger, and a single component heat exchanger, for example the bar and plate heat exchanger. Moreover, owing to such multiple configurations of the mounting arrangement 332, the cooling package mounting assembly 200 may be used to replace an existing type of heat exchanger with another type of heat exchanger in the machine 100.

With the use and implementation of the cooling package mounting assembly 200, various coolers, such as the first charge air cooler 142, the second charge air cooler 144, and the oil cooler 146, of the cooling package 122 may be conveniently mounted on the radiator guard 124. For example, the first charge air cooler 142 of the cooling package 122 may be disposed on the first elongated frame member 202 and coupled to the first top coupling bracket 230 and the first bottom coupling bracket 248. Likewise, the second charge air cooler 144 of the cooling package 122 may be disposed on the second elongated frame member 262 and coupled to The second top coupling bracket 298 and the second bottom coupling bracket 318. Further, the oil cooler 146 may be coupled to the first top coupling bracket 230 and the second top coupling bracket 298. Thus, better air flow across the heat exchanger 138 may be obtained, thereby providing efficient cooling of the coolant flowing through the heat exchanger 138.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A cooling package mounting assembly for a machine having a radiator guard, the cooling package mounting assembly comprising:
   a first elongated frame member having a C-shaped cross section, the first elongated frame member including a top end portion and a bottom end portion opposite to the top end portion of the first elongated frame member;
   a first top leg extending outwardly from the top end portion of the first elongated frame member;
   a first bottom leg extending outwardly from the bottom end portion of the first elongated frame member, along the first top leg;
   a first set of gussets connecting the first bottom leg with the bottom end portion of the first elongated frame member;
   a second elongated frame member, spaced apart from the first elongated frame member, having a C-shaped cross section, the second elongated frame member including a top end portion and a bottom end portion opposite to the top end portion of the second elongated frame member;
   a second top leg extending outwardly from the top end portion of the second elongated frame member;
   a bottom leg extending outwardly from the bottom end portion of the second elongated frame member, along the top leg portion;
   a second set of gussets connecting the second bottom leg with the bottom end portion of the second elongated frame member;
   a first top coupling bracket comprising a first plate configured to be coupled to the radiator guard, and a second plate extending from the first plate and configured to be coupled to the first top leg for coupling the first elongated frame member with the radiator guard;
   a second top coupling bracket comprising a third plate configured to be coupled to the radiator guard, and a fourth plate extending from the third plate and configured to be coupled to the second top leg for coupling the second elongated frame member with the radiator guard;
   a first bottom coupling bracket configured to couple the bottom end portion of the first elongated frame member with the radiator guard;
   a second bottom coupling bracket configured to couple the bottom end portion of the second elongated frame member with the radiator guard; and
   a mounting arrangement coupled to at least one of the first elongated frame member and the second elongated frame member, wherein, in a first configuration of the mounting arrangement, the mounting arrangement is configured to removably support a first type of heat exchanger of the cooling package between the first elongated frame member and the second elongated frame member, and wherein in a second configuration of the mounting arrangement, the mounting arrangement is configured to removably support a second type of heat exchanger of the cooling package between the first elongated frame member and the second elongated frame member.

2. The cooling package mounting assembly of claim 1, wherein the first type of heat exchanger is a grommet tube heat exchanger, and the second type of heat exchanger is a bar and plate heat exchanger.

3. The cooling package mounting assembly of claim 1, wherein in the first configuration, the mounting arrangement comprises:
   a top tank configured to be coupled to each of the first top leg and the second top leg; and
   a bottom tank configured to be coupled to each of the first bottom coupling bracket and the second bottom coupling bracket.

4. The cooling package mounting assembly of claim 3, wherein a plurality of tubes of a cooling core extends between the top tank and the bottom tank such that the cooling core is supported between the first elongated frame member and the second elongated frame member.

5. The cooling package mounting assembly of claim 4, further comprising a plurality of connecting members extending between the first elongated frame member and the second elongated frame member to support the plurality of tubes of the cooling core between the first elongated frame member and the second elongated frame member.

6. The cooling package mounting assembly of claim 1, wherein in the second configuration, the mounting arrangement comprises:

a top mounting plate coupled to the first top leg and the second top leg; and
a bottom mounting plate coupled to first bottom coupling bracket and the second bottom coupling bracket, wherein the top mounting plate, the bottom mounting plate, the first elongated frame member, and the second elongated frame member together define a cuboidal chamber for removably receiving the heat exchanger therein.

7. The cooling package mounting assembly of claim 1, wherein a first charge air cooler of the cooling package is disposed on the first elongated frame member and is coupled to the first top coupling bracket and the first bottom coupling bracket, and a second charge air cooler of the cooling package is disposed on the second elongated frame member and is coupled to the second top coupling bracket and the second bottom coupling bracket.

8. A machine comprising:
a radiator guard;
a cooling package; and
a cooling package mounting assembly coupled to the radiator guard and configured to mount the cooling package on the radiator guard, the cooling package mounting assembly comprising:
a first elongated frame member having a C-shaped cross section, the first elongated frame member including a top end portion and a bottom end portion opposite to the top end portion of the first elongated frame member;
a first top leg extending outwardly from the top end portion of the first elongated frame member;
a first bottom leg extending outwardly from the bottom end portion of the first elongated frame member, along the first top leg;
a first set of gussets connecting the second top leg with the bottom end portion of the first elongated frame member;
a second elongated frame member, spaced apart from the first elongated frame member, having a C-shaped cross section, the second elongated frame member including a top end portion and a bottom end portion opposite the top end portion of the second elongated frame member;
a second top leg extending outwardly from the top end portion of the second elongated frame member;
a bottom leg extending outwardly from the bottom end portion of the second elongated frame member, along the top leg portion;
a second set of gussets connecting the second bottom leg with the bottom end portion of the second elongated frame member;
a first top coupling bracket comprising a first plate configured to be coupled to the radiator guard, and a second plate extending from the first plate and configured to be coupled to the first top leg;
a second top coupling bracket comprising a third plate configured to be coupled to the radiator guard, and a fourth plate extending from the third plate and configured to be coupled to the second top leg;
a first bottom coupling bracket configured to couple the bottom end portion of the first elongated frame member with the radiator guard;
a second bottom coupling bracket configured to couple the bottom end portion of the second elongated frame member with the radiator guard; and
a mounting arrangement coupled to at least one of the first elongated frame member and the second elongated frame member, wherein, in a first configuration of the mounting arrangement, the mounting arrangement is configured to removably support a first type of heat exchanger of a cooling package between the first elongated frame member and the second elongated frame member, and in a second configuration of the mounting arrangement, the mounting arrangement is configured to removably support a second type of heat exchanger of the cooling package between the first elongated frame member and the second elongated frame member.

9. The machine of claim 8, wherein the first type of heat exchanger is a grommet tube heat exchanger, and the second type of heat exchanger is a bar and plate heat exchanger.

10. The machine of claim 8, wherein in the first configuration, the mounting arrangement comprises:
a top tank configured to be coupled to each of the first top leg and the second top leg; and
a bottom tank configured to be coupled to each of the first bottom coupling bracket and the second bottom coupling bracket.

11. The machine of claim 10, wherein a plurality of tubes of a cooling core extends between the top tank and the bottom tank such that the cooling core is supported between the first elongated frame member, and the second elongated frame member.

12. The machine of claim 11, further comprising a plurality of connecting members extending between the first elongated frame member and the second elongated frame member to support the plurality of tubes of the cooling core between the first elongated frame member and the second elongated frame member.

13. The machine of claim 8, wherein in the second configuration, the mounting arrangement comprises:
a top mounting plate coupled to the first top leg and the second top leg; and
a bottom mounting plate coupled to first bottom coupling bracket and the second bottom coupling bracket, wherein the top mounting plate, the bottom mounting plate, the first elongated frame member, and the second elongated frame member together define a cuboidal chamber for removably receiving the heat exchanger therein.

14. The machine of claim 8, wherein a first charge air cooler of the cooling package is disposed on the first elongated frame member and is coupled to the first top coupling bracket and the first bottom coupling bracket, and a second charge air cooler of the cooling package is disposed on the second elongated frame member and is coupled to the second top coupling bracket and the second bottom coupling bracket.

15. A cooling package mounting assembly for a machine having a radiator guard, the cooling package mounting assembly comprising:
a first elongated frame member having a C-shaped cross section, the first elongated frame member including a top end portion and a bottom end portion opposite to the top end portion of the first elongated frame member;
a first top leg extending outwardly from the top end portion of the first elongated frame member;
a first bottom leg extending outwardly from the bottom end portion of the first elongated frame member, along the first top leg;
a first set of gussets connecting the first bottom leg with the bottom end portion of the first elongated frame member;

a second elongated frame member, spaced apart from the first elongated frame member, having a C-shaped cross section, the second elongated frame member including a top end portion and a bottom end portion opposite to the top end portion of the second elongated frame member;

a second top leg extending outwardly from the top end portion of the second elongated frame member;

a second bottom leg extending outwardly from the bottom end portion of the second elongated frame member, along the top leg portion;

a second set of gussets connecting the second bottom leg with the bottom end portion of the second elongated frame member;

a first top coupling bracket comprising a first plate configured to be coupled to the radiator guard, and a second plate extending from the first plate and configured to be coupled to the first top leg for coupling the first elongated frame member with the radiator guard;

a second top coupling bracket comprising a third plate configured to be coupled to the radiator guard, and a fourth plate extending from the third plate and configured to be coupled to the second top leg for coupling the second elongated frame member with the radiator guard;

a first bottom coupling bracket configured to couple the bottom end portion of the first elongated frame member with the radiator guard;

a second bottom coupling bracket configured to couple the bottom end portion of the second elongated frame member with the radiator guard; and a mounting arrangement coupled to at least one of the first elongated frame member and the second elongated frame member, wherein, in a first configuration of the mounting arrangement, the mounting arrangement is configured to removably support a first type of heat exchanger of the cooling package between the first elongated frame member and the second elongated frame member, and wherein in a second configuration of the mounting arrangement, the mounting arrangement is configured to removably support a second type of heat exchanger of the cooling package between the first elongated frame member and the second elongated frame member, wherein in the first configuration, the mounting arrangement comprises a top tank configured to be coupled to each of the first top leg and the second top leg, and a bottom tank configured to be coupled to each of the first bottom coupling bracket and the second bottom coupling bracket, wherein a plurality of tubes of a cooling core extends between the top tank and the bottom tank such that the cooling core is supported between the first elongated frame member and the second elongated frame member, and wherein in the second configuration, the mounting arrangement comprises a top mounting plate coupled to the first top leg and the second top leg, and a bottom mounting plate coupled to first bottom coupling bracket and the second bottom coupling bracket, wherein the top mounting plate, the bottom mounting plate, the first elongated frame member, and the second elongated frame member together define a cuboidal chamber for removably receiving the heat exchanger therein.

16. The cooling package mounting assembly of claim 15, wherein a first charge air cooler of the cooling package is disposed on the first elongated frame member and is coupled to the first top coupling bracket and the first bottom coupling bracket, and a second charge air cooler of the cooling package is disposed on the second elongated frame member and is coupled to the second top coupling bracket and the second bottom coupling bracket.

* * * * *